(12) United States Patent
Gunturi et al.

(10) Patent No.: US 12,500,638 B2
(45) Date of Patent: Dec. 16, 2025

(54) ESTIMATION AND PRE-COMPENSATION OF HARMONIC COUPLING SPURS

(71) Applicant: TEXAS INSTRUMENTS INCORPORATED, Dallas, TX (US)

(72) Inventors: Sarma Sundareswara Gunturi, Bangalore (IN); Divyeshkumar Mahendrabhai Patel, Bangalore (IN); Sai Vaibhav Batchu, Tadepalligudem (IN); Divyansh Deepak Jain, Bengaluru (IN); Aswath Vs, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 588 days.

(21) Appl. No.: 17/829,218

(22) Filed: May 31, 2022

(65) Prior Publication Data
US 2023/0387975 A1   Nov. 30, 2023

(51) Int. Cl.
*H04B 7/06* (2006.01)

(52) U.S. Cl.
CPC ...................... *H04B 7/06* (2013.01)

(58) Field of Classification Search
CPC ........................................................ H04B 7/06
See application file for complete search history.

(56) References Cited

U.S. PATENT DOCUMENTS

| | | | |
|---|---|---|---|
| 2005/0254595 A1* | 11/2005 | Song | H04W 56/00 375/296 |
| 2012/0121036 A1* | 5/2012 | Van Renterghem | H04L 27/367 375/296 |
| 2013/0200948 A1* | 8/2013 | Lee | H03F 1/3241 330/10 |
| 2018/0366815 A1* | 12/2018 | Rheinfelder | H04B 7/04 |

* cited by examiner

*Primary Examiner* — Kabir A Timory
(74) *Attorney, Agent, or Firm* — Mandy Barsilai Fernandez; Frank D. Cimino (57) ABSTRACT

Examples of this description provide for a method. In some examples, the method includes determining, via a circuit, an estimated value of harmonic coupling in a transmitted signal via a feedback signal path that receives the transmitted signal and performing pre-compensation for the harmonic coupling based on the estimated value, the pre-compensation performed in the circuit.

20 Claims, 3 Drawing Sheets

ESTIMATION AND PRE-COMPENSATION OF HARMONIC COUPLING SPURS

BACKGROUND

Multiple input multiple output (MIMO) architectures (such as a fifth generation (5G) base station or dual band macro base station) include multiple transmit antennas and multiple receive antennas to facilitate increased throughput, such as via beamforming and spatial multiplexing. An increase in the number of antennas in a MIMO architecture can decrease physical spacing between the antennas.

SUMMARY

In some examples, a circuit has an input operable to receive data and an output operable to provide a transmitted signal. The circuit includes a transmission signal chain including a harmonic coupling cancellation circuit operable to output a harmonic coupling cancellation signal, a digital up-conversion (DUC) circuit having an output, a first input operable to receive the harmonic coupling cancellation signal, and a second input coupled to the circuit input, the DUC circuit operable to modify the data by the harmonic coupling cancellation signal, and a digital-to-analog converter (DAC) having an input coupled to the output of the DUC and having an output, the DAC configured to provide the transmitted signal at the output of the DAC. The circuit also includes a feedback signal chain including an estimation circuit, the estimation circuit operable to estimate a spurious harmonic coupling signal according to the transmitted signal, and provide values representative of the estimate of the spurious harmonic coupling signal to the harmonic coupling cancellation circuit. The harmonic coupling cancellation signal is based on the estimate of the spurious harmonic coupling signal.

In some examples, a system includes an amplifier having an input and an output and a transceiver. The transceiver has a communication interface, a transmit signal chain having an input coupled to an output of the communication interface and an output coupled to the input of the amplifier, wherein the transmit signal path is configured to provide a signal for transmission to the amplifier, and a feedback signal chain having an input coupled to the output of the amplifier and an output coupled to an input of the communication interface. The feedback signal chain is configured to estimate a spurious harmonic coupling component of a signal transmitted by the amplifier, and provide values representative of the estimate of the spurious harmonic coupling component to the transmit signal path for compensation for the spurious harmonic coupling component in the signal for transmission.

In some examples, a method includes determining, via a circuit, an estimated value of harmonic coupling in a transmitted signal via a feedback signal path that receives the transmitted signal and performing pre-compensation for the harmonic coupling based on the estimated value, the pre-compensation performed in the circuit.

DETAILED DESCRIPTION

As physical spacing between antennas decreases, such as in a MIMO architecture in which an increased number of antennas are included (e.g., such as 32, 64, or more transmit (TX) antennas and 32, 64, or more receive (RX) antennas), coupling (e.g., cross-talk and/or interference) between transmit signal chains (which are connected to those antennas) may occur. In some examples, the coupling is electromagnetic coupling. In other examples, the coupling may be substrate coupling. The coupling may increase noise experienced by signals being communicated via the transmit channel and/or reducing or otherwise degrading performance of a system that receives signals transmitted via the transmit signal chains.

Some of the example embodiments may compensate for spurious signals in a signal chain of a device, such as may result from harmonic coupling between signal chains or components in an electronic device, to mitigate effects of the coupling. For example, the compensation may improve isolation between or among the signal chains or components. In an example, the compensation may be performed as a pre-compensation by providing a frequency spur with a programmed amplitude, frequency, and phase in a digital baseband of the system. In some examples, the amplitude, frequency, and phase are determined by an estimation performed during a power-up calibration of the system. The estimation may be performed via a loopback from a transmitter output to an auxiliary receiver input, such as of a feedback path. For example, a programmed calibration signal (e.g., a signal having known or controlled values) may be provided to perform the estimation via the feedback path. During steady-state operation of the system, the amplitude and the phase may be monitored and modified based on time and temperature variations. In at least some examples, the estimation is based on a measurement performed based on a transmitted signal received at a feedback signal path without the implementation of a dedicated time slot in transmission for measurement and estimation.

Figure 1:
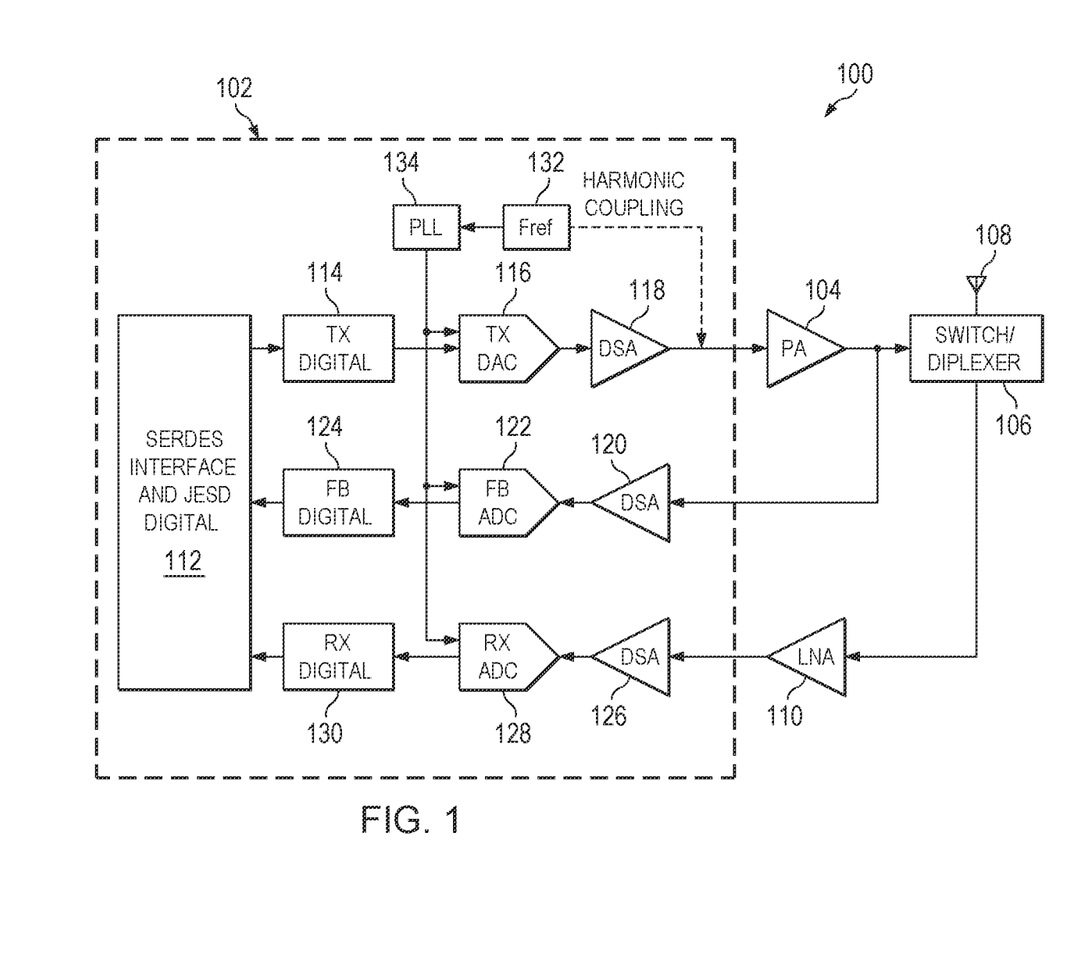
FIG. 1 is a block diagram of a communication system, in accordance with various examples.

FIG. 1 is a block diagram of a communication system 100, in accordance with various examples. In some examples, the communication system 100 is, or includes, a MIMO architecture. For example, the communication system 100 may be, or be a part of, a 5G base station or dual band macro base station that facilitates communication according to a MIMO architecture or MIMO technologies. In some examples, the system 100 includes a transceiver 102, an amplifier 104 (e.g., a power amplifier (PA)), a diplexer 106, an antenna 108, and an amplifier 110 (e.g., a low-noise amplifier (LNA)). The transceiver 102 may have an output (e.g., of a transmit signal path) coupled to an input of the amplifier 104. The diplexer 106 has an input coupled to an output of the amplifier 104. The transceiver 102 has a first input (e.g., a feedback signal path) coupled to the output of the amplifier 104. The diplexer 106 has a first input/output coupled to the antenna 108. The diplexer 106 has a second output coupled to an input of the amplifier 110. The amplifier 110 has an output coupled to a second input (e.g., a receive signal path) of the transceiver 102.

In some examples, the transceiver 102 includes a digital interface 112 (which may include, for example, a processor, memory, digital circuitry, analog circuitry and/or software), such as a serializer/deserializer (SerDes) interface and/or a JESD digital interface. The transceiver 102 also includes a digital processing circuit 114 (which may include, for example, a processor, memory, digital circuitry, analog circuitry and/or software), a digital-to-analog converter (DAC) 116, a digital step attenuator (DSA) 118, a DSA 120, an analog-to-digital converter (ADC) 122, a digital processing circuit 124 (which may include, for example, a processor, memory, digital circuitry, analog circuitry and/or software), a DSA 126, an ADC 128, a digital processing circuit 130 (which may include, for example, a processor, memory, digital circuitry, analog circuitry and/or software), a reference clock (Fref) generation circuit 132, and a phase-locked loop (PLL) circuit 134 (e.g., a digital PLL or an analog PLL).

The circuit 114 is coupled to, and configured to receive data from the interface 112, and provide data to the DAC 116. In some examples, the circuit 114 processes, modifies, alters, or otherwise interacts with the data received from the interface 112 to create a signal that includes the data and is pre-compensated for estimated harmonic coupling, such as estimated according to the teachings of the present disclosure. In an example, the circuit 114 receives the signal which carries the data to be transmitted and processes, modifies, alters, or otherwise interacts with the data and the signal by adding another signal to the received signal. The other signal may be a compensation signal, as determined according to the teachings of the present disclosure, for compensating for the spurious harmonic coupling described herein. In various examples, the circuit 114 may include various sub-circuits (not shown) such as interpolation filters, digital up conversion mixers, etc. to facilitate further processing, modification, alteration, or interaction by the circuit 114, including interpolation and/or frequency translation to provide a signal for transmission.

The transmittable signal is provided to the DAC 116 for conversion from a digital signal to an equivalent analog signal. The DAC 116 is coupled and configured to provide the analog signal (that includes the data received from interface 112) to the DSA 118. DSA 118 selectively attenuates all or a portion of the analog signal. Power amplifier 104 amplifies the attenuated analog signal so that the amplified signal may be transmitted via switch/diplexer 106 and antenna 108. In some implementations, the circuit 114, the DAC 116, and the DSA 118 form, or are components of, a transmit signal path of the transceiver 102. In some examples, harmonic coupling (e.g., such as electro-magnetic or substrate coupling) may occur between the DSA 118 and the amplifier 104. For example, harmonics of a Fref of the transceiver may undesirably couple to an output of the DSA 118, adversely affecting operation of the transceiver 102. In addition, as is shown in FIG. 1, harmonic coupling may be present from Fref circuitry 132 at the output of DSA 118. The DSA 120 is coupled and configured to receive data from the amplifier 104 and provide data to the ADC 122. The DSA 120 selectively attenuates (e.g., attenuates certain frequencies or frequency bands more or less than other frequencies or frequency bands) the amplified analog signal (e.g., the output of PA 104) to protect the circuitry in the feedback path (namely, ADC 122 and digital circuitry 124). The ADC 122 is coupled and configured to convert the attenuated analog signal to an equivalent digital signal and provide the digital signal to circuitry 124. In some examples, the digital processing circuit 124 processes, modifies, alters, or otherwise interacts with the data received from the ADC 122 to create a signal that includes the data to provide to the interface 112. For example, the digital processing circuit 124 may receive a signal at a sampling rate of the ADC 122 and may down convert the signal to reduce a frequency of the signal and/or perform decimation of data of the signal. In some implementations, the DSA 120, the ADC 122, and the digital processing circuit 124 form, or are components of, a feedback signal path of the transceiver 102. The DSA 126 is coupled and configured to receive data from the amplifier 110 and provide data to the ADC 128. The ADC 128 is coupled and configured to provide data to the circuit 130. In some examples, the circuit 130 processes, modifies, alters, or otherwise interacts with the data received from the ADC 128 to create data signal to provide to the interface 112. In some implementations, the DSA 126, the ADC 128, and the circuit 130 form, or are components of, a receive signal path of the transceiver 102. In some examples, the Fref generation circuit 132 provides Fref to the PLL circuit 134. Based on Fref, the PLL provides a clock signal to the DAC 116, the ADC 122, and the ADC 128 to facilitate operation of the DAC 116, the ADC 122, and the ADC 128, respectively.

As described above, in some operational circumstances harmonic coupling may occur between or among components of the transceiver 102, such as between the DSA 118 and the amplifier 104. In other examples, the harmonic coupling is injected into a transmission signal chain of the transceiver 102 at any location(s) within the transmission signal chain and not between any two specific components. This harmonic coupling may include electro-magnetic coupling, substrate coupling, or a combination thereof. In some examples, the harmonic coupling results from generation of Fref by the Fref generation circuit 132. This harmonic coupling can adversely affect transmissions by the transceiver 102, such that data transmitted by the transceiver 102 may be unreliable at least partially resulting from the harmonic coupling. The coupling may also cause emissions of the transceiver 102 to exceed regulatory specifications for the transceiver 102, such as regulatory specifications regarding a level of spurious emissions outside of a frequency band of transmission by the transceiver 102. To compensate for, correct for, or otherwise mitigate the effects of the harmonic coupling, the circuit 114 may combine a controlled frequency spur with data received from the interface 112 prior to providing the data to the DAC 116. The frequency spur may be controlled such that it has a programmed amplitude, frequency, and/or phase based on determinations, calculations, estimations, or other processing performed by the transceiver 102. In some examples, at least some of the processing is performed during a calibration operation of the transceiver 102, such as during a power-up phase of the transceiver 102. The processing may further track or monitor signals associated with the transceiver 102 subsequent to the power-up phase (e.g., during an operational phase) to address transient, temperature, or other variations that may occur. Some of these variations may include changes to the amplitude or phase based on time or temperature variations. The processing may include estimation based on data received via the feedback signal path such that the frequency spur may be based on, derived from, or otherwise related to data received by the transceiver 102 via the feedback signal path.

Figure 2:
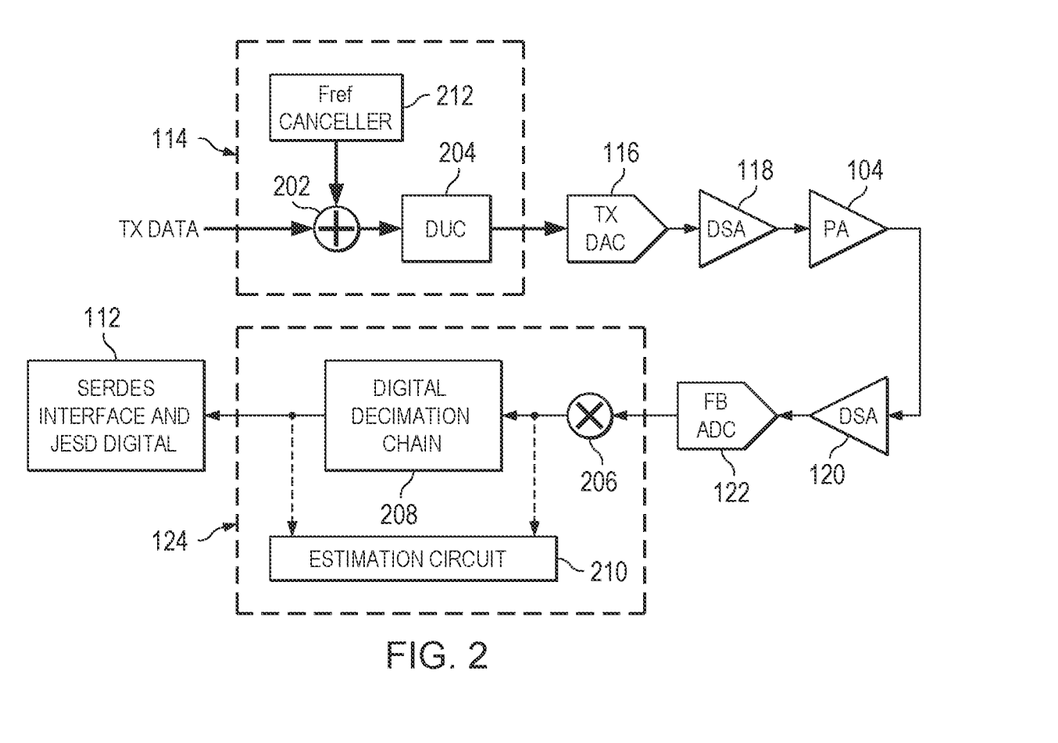
FIG. 2 is a block diagram of a transceiver, in accordance with various examples.

FIG. 2 is a block diagram of a transceiver 102, in accordance with various examples. As shown in FIG. 2, in some examples the circuit 114 includes an adder 202 and a digital up-conversion (DUC) circuit 204. Although shown in FIG. 2 as a single component, in various examples the DUC circuit 204 may include multiple stages to provide signal processing functionality, such as interpolation filters, mixers, etc. Adder 202 (and other adders illustrated in the drawings) may be implemented using conventional circuitry or may be implemented by connecting conductors, each carrying separate signals, so that the connection results in the sum their signals at or near the point of connection. In some examples, the digital processing circuit 124 includes a mixer 206, a digital decimation chain (DDC) 208, and an estimation circuit 210. In an example, the DUC 204 may include, for example, a processor, a state machine, logic circuitry, digital circuitry, memory, analog circuitry, software and/or any combination thereof suitable for performing data interpolation, frequency conversion (e.g., such as up conversion), and the like. The mixer 206 may include, for example, a processor, a state machine, logic circuitry, digital circuitry, memory, analog circuitry, software and/or any combination thereof suitable for performing signal mixing. In an example, the mixer 206 includes a numerically controlled oscillator (NCO) to generate or otherwise provide a local oscillator signal at a programmed frequency. The DDC 208 may include, for example, a processor, a state machine, logic circuitry, digital circuitry, memory, analog circuitry, software and/or any combination thereof suitable for performing signal decimation. The DDC 208 may include, for example, a processor, a state machine, logic circuitry, digital circuitry, memory, analog circuitry, software and/or any combination thereof suitable for performing the functions described herein.

In some examples, the adder 202 receives data from the interface 112 and adds a signal which corresponds to a digital representation of a continuous wave tone of frequency $f_{spur}$ to the received data to form compensated data. In some embodiments, the added frequency spur may correct for or mitigate the effects of the undesired harmonic coupling. The amplitude, frequency and/or phase of the added frequency spur may be determined during power-up calibration and/or during run-time (mission mode), to address time-related (aging) and/or temperature variations (for example). The compensated data is provided to the DUC circuit 204 for conversion prior to providing to the DAC 116. The DUC circuit 204 scales (e.g., up converts) a sample rate of the compensated data, such as from a baseband frequency (or baseband frequency as modified by $f_{spur}$) to an intermediate frequency or a transmission frequency of the transceiver 102. The mixer 206 receives a digital version of the output of power amplifier 104 via DSA 120 and ADC 122. Mixer 206 mixes the digital signal output by ADC 122 and provides the mixed version to the DDC 208 and the estimation circuit 210. For example, the mixer 206 may convert the output of the ADC 122 from a radio frequency signal to a baseband or other frequency signal, such as by performing frequency translation. The DDC 208 modifies a sample rate of the output of the mixer 206, such as from an ADC sampling frequency to an interface rate of the interface 112 or another component (not shown) to which the DDC 208 is coupled. The DDC 208 provides the modified sampling rate data as an output, such as for providing to the interface 112.

The estimation circuit 210 estimates a value of the harmonic coupling, during an initial calibration of the device or during run-mode as described above. For example, a signal (e.g., a digital signal, such as data) may be provided to the adder 202 to cause a continuous wave tone at a programmed baseband frequency ($f_{B1}$) to be transmitted by the transmit signal path. The signal may be provided by a Fref canceller 212. The Fref canceller 212 may include, for example, a processor, a state machine, logic circuitry, digital circuitry, memory, analog circuitry, software and/or any combination thereof. The Fref canceller 212 may be configured to provide a signal at a programmed amplitude, frequency, and phase (or provides a digital signal that, when converted to an analog signal, has a programmed amplitude, frequency and phase). For example, the Fref canceller 212 may provide a digital representation of a continuous wave tone, as described herein, at frequency $f_{spur}$. In some examples, $f_{B1}$ is selected such that a frequency ($f_{transmit}$) of a signal at an output of the amplifier 104 is approximately equal to $$f_{transmit} = LO + f_{B1}, \quad (1)$$

which is approximately equal to a frequency of the harmonic coupling, and in which LO is a local oscillator carrier frequency of the transmit signal path. The estimation circuit 210 may estimate the value of the harmonic coupling according to any suitable process. In an example, the estimation circuit 210 may measure an amplitude and phase of a direct current (DC) signal provided as an output of the mixer 206. The measurement may be performed, for example, via an infinite impulse response (IIR) filter based on an output of a mixer that has a local oscillator tuned to a frequency of $LO + f_{B1}$. In another example, the mixer 206 has an offset from $f_{B1}$ and the estimation circuit 210 determines the amplitude and phase of the resulting signal, such as via a fast Fourier transform (FFT) or Goertzel processing, to determine the amplitude and phase of $f_{B1}$.

The following description refers to particular frequencies to aid in clarity and understanding of this disclosure. However, such frequencies are exemplary and shall not be construed as limiting the examples of this disclosure to only the example frequencies recited. Assuming that the signal at frequency $LO + f_{B1}$ is provided by the transmit signal chain (e.g., provided by the amplifier 104), a signal provided at the output of the ADC 122 is located at frequency $f_{FB,LO}$. For example, if LO is 3500 megahertz (MHz) and $f_{B1}$ is 10 MHz, then a frequency at the output of the amplifier 104 is 3510 MHz. For a sampling frequency of the ADC 122 of 3000 megasamples per second (MSPS), after sampling by the ADC 122, the 3510 MHz signal will be at 510 MHz due to aliasing. Thus, in this example, $f_{FB,LO}$ is 510 MHz.

In an example, the mixer 206 mixes an output signal of the ADC 122 with a local oscillator signal corresponding to $f_{FB,LO}$ to cause the mixer 206 to down convert the continuous wave tone to DC, as represented by a complex signal. This complex signal may be measured by an IIR, such as implemented in the estimation circuit 210, to determine the amplitude and phase of the DC representation of the continuous wave tone. For example, the IIR measures signal levels in the real and imaginary parts of the complex signal. Assuming the DC estimation in the real and imaginary parts of the signal is $DCest_I$ and $DCest_Q$, and together provide measurements $m_1$ and $m_2$, respectively, which will be described below with respect to performing the calibration. In at least some examples, $m_1$ and $m_2$ are complex values having both in-phase (I) and a quadrature phase (Q) components.

A local oscillator signal having a frequency of 500 MHz, when mixed with the output signal of the ADC 122, may cause an output of the mixer 206 to be the continuous wave tone at a frequency of $f_{B1}$. In an example, to determine the amplitude and phase of the real and imaginary parts of the continuous wave tone, the estimation circuit 210 may perform a FFT on an output of the DDC 208. In another example, to determine the amplitude and phase of the continuous wave tone, the estimation circuit 210 may perform a FFT on an output of the mixer 206. In various examples, for an interface rate (e.g., the clocking rate of interface circuitry 112) of 245.76 MSPS, a 512-point FFT provides a frequency resolution of 0.48 MHz. To facilitate accurate amplitude and phase measurement, the frequency at the output of the DDC 208 ($f_{FB,B1}$) should correspond to a particular frequency bin ($f_{bin}$) and not between frequency bins, which may cause inaccuracy in measurements. In the above example, because the resolution of the FFT is 0.48 MHz, $f_{B1}$ is chosen as 9.6 MHz so that $$f_{bin} = \frac{9.6}{0.48} = 20.$$

The measurement of the real and imaginary components of $f_{bin}$, including amplitude and phase information of the tone on $f_{bin}$, provide $m_1$ and $m_2$, which will be described below with respect to performing the calibration.

A signal from the transmit signal path to the feedback signal path passes through a channel (e.g., a medium through which a signal passes from the output of the amplifier 104 to the input of the DSA 120). The signals are complex baseband signals represented with amplitude and phase information. The harmonic coupling spur has an amplitude ($\alpha$) and a phase ($\phi$), and h is the coefficient for the channel (e.g., an amplitude and phase response of the channel). The continuous wave tone has a frequency $f_{B1}$, as described above, and an amplitude $A_1$. The baseband model of the signal at the feedback signal path output (e.g., an output of the mixer 206 or of the digital processing circuit 124) is represented by $$h(A_1 + \alpha e^{-j\phi}) = m_1 \qquad (2)$$

Two measurements may be performed at the output of the feedback signal path with known amplitudes $A_1$ and $A_2$ for the continuous wave tone provided by the Fref canceller 212 such that $$h(A_2 + \alpha e^{-j\phi}) = m_2 \qquad (3)$$

For example, taking $A_1 = A$ and $A_2 = -A$, then $$h = \frac{m_1 - m_2}{2A}; \qquad (4)$$

and $$\alpha e^{-j\phi} = \frac{m_1 + m_2}{2h}. \qquad (5)$$

Thus, the magnitude and phase of $$\frac{m_1 + m_2}{2h}$$

provides an estimate for $\alpha$ and phase $phase_1 = -\phi$. The amplitude and phase of the continuous wave tone at frequency $f_{spur}$ to mitigate the harmonic coupling is determined as $\alpha$ and $\pi + phase_1$, respectively. In some examples, this amplitude and phase is useful for the estimation circuit 210 to provide the continuous wave tone at frequency $f_{spur}$ to mitigate the harmonic coupling. In other examples, the amplitude and phase is provided by the estimation circuit 210 to another component (not shown) to cause or otherwise aid the other component in providing the continuous wave tone at frequency $f_{spur}$ to mitigate the harmonic coupling. In other examples, the estimation circuit 210 provides the real and imaginary, or in-phase and quadrature, parts of the continuous wave tone at frequency $f_{spur}$ to mitigate the harmonic coupling. In some examples, that other component may be the Fref canceller 212.

In this disclosure it is assumed that the carrier frequency of a transmit channel imparting the harmonic coupling and a transmit channel being affected by the harmonic coupling is the same. Also, the transceiver 102 may perform pre-compensation for $f_{B1}$ based on determinations made during power-up of the transceiver 102 and perform compensation at a later time after power-up according to another carrier frequency.

While the harmonic coupling is generally described herein as occurring between the DSA 118 and the amplifier 104 (e.g., post-DSA coupling), in some examples the harmonic coupling alternatively, or additionally, occurs between the DAC 116 and the DSA 118 (e.g., pre-DSA coupling). Coupling coefficients of the harmonic coupling may be denoted as $\alpha_{pre}$ and $\alpha_{post}$ for pre-DSA coupling and post-DSA coupling, respectively. Thus, spur correction coefficients corresponding to $\alpha_{pre}$ and $\alpha_{post}$ in the digital domain are $\alpha_{pre,corr}e^{-j\phi}$ and $\alpha_{post,corr}e^{-j\phi}$. In an example, the power-up calibration may be performed for multiple attenuation settings of the DSA 118. Based on a current attenuation setting of the DSA 118, spur correction coefficients may be determined and the continuous wave tone at frequency $f_{spur}$ be applied to the transceiver 102. In another example, the coupling coefficient $\alpha$, as described above, can be separated into $\alpha_{pre}$ and $\alpha_{post}$ for the transmit signal path. The components $\alpha_{pre}$ and $\alpha_{post}$ are estimated by performing the calibration measurement at two selected gain steps of the transmit signal path. Assuming the gain settings are $g_1$ and $g_2$, then the measured coupling at these two gain settings are $$\alpha_{pre} * g_1 + \alpha_{post} = \alpha_1 \text{ and} \qquad (6)$$

$$\alpha_{pre} * g_2 + \alpha_{post} = \alpha_2. \qquad (7)$$

Because $g_1$ and $g_2$ are selected, or programmed values, $\alpha_{pre}$ and $\alpha_{post}$ can be determined. For example, if the gain transmit signal path for the kth gain index is $g_{ak}$, then the post-DSA coupling component is multiplied by $1/g_{ak}$. Pre and post digital correction factors to be used for the kth gain setting of transmit signal path chain are updated as $$\alpha_{pre,corr}e^{-j\phi}$$

and $$\frac{\alpha_{post,corr}}{g_{ak}}e^{-j\phi}.$$

In another example, the spur correction for multiple attenuation settings of the DSA 118 in the transmit signal path is determined and stored for use in mitigation of harmonic coupling, such as by storing the correction values in a lookup table.

Figure 3:
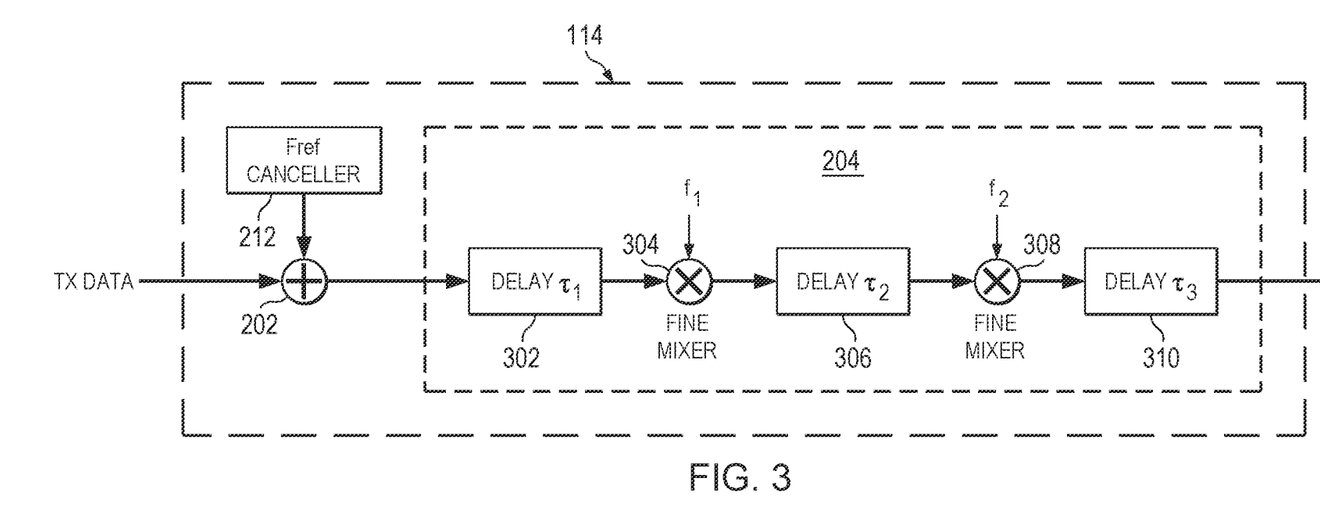
FIG. 3 is a block diagram of a transceiver, in accordance with various examples.

FIG. 3 is a block diagram of a transceiver, in accordance with various examples. In some examples, the DUC circuit 204 implements up conversion in multiple stages. A two-stage up conversion is shown in FIG. 3, but any number of stages may be useful. For example, the DUC circuit 204 includes a circuit 302, a mixer 304, a circuit 306, a mixer 308, and a circuit 310. The mixer 304 and the mixer 308 may each have the same or different resolutions and may each respectively perform frequency translation to increase a frequency of a received signal prior to output. In some examples, the mixer 304 and the mixer 308 are each implemented as multipliers. The circuits 302, 306, 310 may be of any suitable architecture to manipulate a received signal to provide a modified signal, the scope of which is not limited herein. For example, the circuits 302, 306, 310 may include analog and/or digital circuitry components. In at least some examples, the circuits 302, 306, 310 are components of a multi-stage DUC, such that the circuits 302, 306, 310 are, or include circuitry of, digital or analog filter circuits. Each of the circuits 302, 306, and 310 may have associated delays based on their architectures. For example, FIG. 3 assumes delays represented as $\tau_1$, $\tau_2$ and $\tau_3$ between the adder 202 and the mixer 304, between the mixer 304 and the mixer 308, and between the mixer 308 and a point in the transmit signal path at which the harmonic coupling occurs, respectively.

Assuming $f_{B1}$ is the baseband frequency of the continuous wave tone at frequency $f_{spur}$, it is up converted by the mixer 304 and the mixer 308 to cancel the harmonic coupling at frequency $f_{harm}$. Assuming, for example, the frequency of the mixer 304 (e.g., 1$^{st}$ stage mixer) is $f_1$ and mixer 308 (e.g., 2$^{nd}$ stage mixer) is $f_2$, in a first measurement, the phase of $f_{B1}$ is $\theta_1$ to mitigate the harmonic coupling. The baseband model for the transceiver 102 provides $$\theta_1 - 2\pi f_{B1}\tau_1 = \phi_{harm} + \pi, \tag{8}$$

where $\phi_{harm}$ is the phase of the harmonic coupling. Assuming the mixing frequency of the mixer 304 is modified to $f_1 + \Delta_1$ and mixer 308 is kept at $f_2$, the baseband frequency of the continuous wave tone at frequency $f_{spur}$ is modified to $f_{B1} - \Delta_1$ to mitigate the harmonic coupling. Let the phase of the baseband tone to mitigate the harmonic coupling be $\theta_2$. The power-up calibration described above with respect to FIG. 2. is repeated for this new frequency to determine the phase. Because $$\theta_2 - 2\pi(f_{B1} - \Delta_1)\tau_1 = \phi_{harm} + \pi, \tag{9}$$

then $$2\pi\Delta_1\tau_1 = \theta_1 - \theta_2. \tag{10}$$

Thus, the phase change due to $\Delta_1$ frequency change in mixer 304 is determined according to the above relation. In at least some examples the frequency change in mixer 304 is an integer multiple of $\Delta_1$. The phase change due to the mixer frequency change is determined by multiplying the phase change due to $\Delta_1$. For example, if the mixer 304 frequency is shifted to $f_1 + k_1\Delta_1$ then the phase of the continuous wave tone at frequency $f_{spur}$ to mitigate the harmonic coupling is $\theta_1 + k_1(\theta_2 - \theta_1)$.

Similarly, the step change of the mixer 308 may be considered. Considering the baseband model with carrier frequency being that of mixer 308, the phase $\theta_1$ to mitigate the harmonic coupling can also be described as $$\theta_1 - 2\pi f_{B1}\tau_1 - 2\pi(f_{B1}+f_1)\tau_2 = \phi_{harm} + \pi, \tag{11}$$

where $f_{B1}$ is the frequency of the spur being injected by Fref canceller 212 to the adder 202 and $f_1$ is the local oscillator frequency of the mixer 304. Assume the mixer 308 frequency is shifted to $f_2 + \Delta_2$. The power-up calibration described above with respect to FIG. 2 may be repeated for the new frequency of the mixer 308 to determine a new phase, $\theta_3$. For example, phase $\theta_3$ may be used to mitigate $f_{harm}$, so $$\theta_3 - 2\pi(f_{B1}-\Delta_2)\tau_1 - 2\pi(f_{B1}+f_1-\Delta_2)\tau_2 = \phi_{harm} + \pi. \tag{12}$$

To maintain the compensation for the harmonic coupling, the baseband frequency of the continuous wave tone at frequency $f_{spur}$ for the repeated power-up calibration may be changed to $f_{B1} - \Delta_2$. From the above two relations, it can be determined that $$2\pi\Delta_2\tau_2 = \theta_3 - \theta_1 - 2\pi\Delta_2\tau_1 = \theta_1 - \theta_3 - \frac{\Delta_2}{\Delta_1}(\theta_1 - \theta_2). \tag{13}$$

In at least some examples, the frequency change in mixer 308 is chosen as an integer multiple of $\Delta_2$. For example, if the mixer 308 frequency is shifted to $f_2 + k_2\Delta_2$, then the phase of the continuous wave tone at frequency $f_{spur}$ to mitigate the harmonic coupling is $\theta_1 + k_2(\theta_3 - \theta_1)$. In at least some examples, if frequencies of both the mixer 304 and mixer 308 are changed according to $f_1 + k_4\Delta_1$ and $f_2 + k_3\Delta_2$, respectively, the phase of the continuous wave tone at frequency $f_{spur}$ to mitigate the harmonic coupling is $\theta_1 + k_4(\theta_2 - \theta_1) + k_3(\theta_3 - \theta_1)$.

Because the pre-compensation is to mitigate the harmonic coupling in the analog domain, the magnitude of the harmonic coupling to be corrected may not depend on the carrier frequency of the transmit signal path. However, the phase of the continuous wave tone at frequency $f_{spur}$ may depend on the carrier frequency of the transmit signal path.

During power-up calibration, as described above, the amplitude and phase of the continuous wave tone at frequency $f_{spur}$ in the baseband is determined. In addition to the above calibration steps, calibration may be performed with multiple shifts of the local oscillator frequencies of both the mixer 304 and mixer 308. For example, calibration may be performed with a unit step change in the carrier frequency. In an example, if the step change for the carrier frequency is 1 kilohertz (kHz) and the phase change of the continuous wave tone at frequency $f_{spur}$ for 1 kHz change in carrier frequency is $\phi_{1\ KHz}$ then for a carrier frequency change by a multiple m of 1 kHz, the phase change in the continuous wave tone at frequency $f_{spur}$ for the new carrier frequency=m*$\phi_{1\ KHz}$. In another example, the phase change is measured for multiple steps of the carrier frequency. For example, phase change is measured for a shift of 1 kHz, 10 kHz, 100 kHz, and so on. The measured phase change is represented as $\phi_{1\ KHz}$, $\phi_{10\ KHz}$, $\phi_{100\ KHz}$ and so on, respectively. In the system, the change in carrier frequency is expressed as multiples of steps of 1 kHz, 10 kHz, 100 kHz and so on. The multiples $m_{1\ kHz}$, $m_{10\ kHz}$, $m_{100\ kHz}$ and so on, respectively describe the change in the carrier frequency. The phase change for the continuous wave tone at frequency $f_{spur}$ for the new carrier frequency may then be computed as $\phi_{LO\ change} = m_{1\ kHz}\phi_{1\ kHz} + m_{10\ kHz}\phi_{10\ kHz} + m_{100\ kHz}\phi_{100\ kHz} \cdots$.

Figure 4:
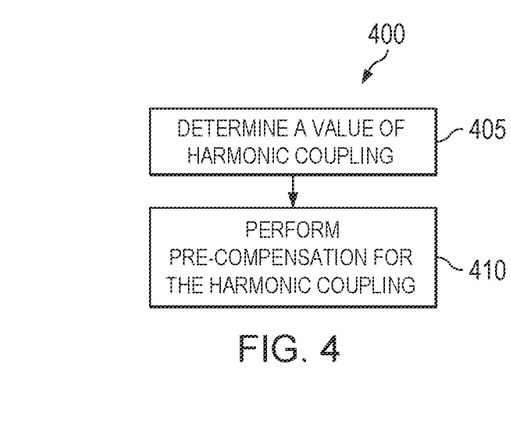
FIG. 4 is a flow diagram of a method of operation of a transceiver, in accordance with various examples.

FIG. 4 is a flow diagram of a method 400 of operation of a transceiver, in accordance with various examples. In at least some examples, the transceiver is the transceiver 102. Accordingly, reference may be made to components or signals of the transceiver 102, as described above with reference to other figures herein. In some examples, the transceiver is operated to perform estimation and/or pre-compensation of harmonic coupling. For example, left uncompensated, the harmonic coupling may affect a signal being transmitted by the transceiver 102, adversely affecting a component, device, or system that receives and operates according to that signal.

At operation 405, a value of harmonic coupling is determined. In some examples, the value of the harmonic coupling is represented as an amplitude and a phase of the harmonic coupling. In other examples, the value of the harmonic coupling is represented as the real and imaginary (or in-phase and quadrature) components of the harmonic coupling. The value of the harmonic coupling may be determined as described above herein, such as during a calibration phase of operation (e.g., at start-up and/or during mission mode operation at certain times and/or intervals of time). For example, calibration data may be transmitted by the transceiver and feedback data derived from the transmitted data may be processed to determine the value of the harmonic coupling. In some examples, the value of harmonic coupling is determined for multiple transmission center frequencies, such as by stepping through range of transmission center frequencies.

At operation 410, pre-compensation for the harmonic coupling is performed. For example, based on the determined amplitude and phase of the harmonic coupling, the transceiver determines and provides a continuous wave tone at frequency $f_{spur}$, as described above herein. The transceiver may add the continuous wave tone to data received by the transceiver for transmission to form compensated data. The compensated data may no longer be representative of values that were represented by the data prior to the addition of the continuous wave tone and formation of the compensated data. However, the compensated data, after being affected by the harmonic coupling described herein, based on the performed pre-compensation, may again be representative of values that were represented by the data prior to the addition of the continuous wave tone and formation of the compensated data. This is in contrast to the data, left uncompensated, being affected by the harmonic coupling such that, after being affected by the harmonic coupling described herein, the data may no longer be representative of values that were represented by the data prior to the effects of the harmonic coupling.

In an example embodiment, the amplitude and phase of spurious harmonic coupling signal(s) may be calculated/quantified during a power-up calibration of the transceiver system, and such spurious signal may be mitigated/compensated for by injecting a transmit spur (e.g., in the digital baseband) during run-time/mission mode operation. These values may be used during run-time/mission mode operation of the transceiver system to mitigate/compensate for the harmonic coupling signal(s). In some embodiments, additional background tracking of the amplitude and phase of spurious harmonic coupling signal(s) may be calculated/quantified during run-time/mission mode operation. This additional information can be used to compensate for/mitigate system variations due to aging and/or temperature. In some example embodiments, during power-up calibration, the output of digital processing circuit 124 (FIG. 1) is measured where a known signal is provided at the output of circuitry 114 (FIG. 1). The amplitude and phase of the harmonic coupling signal(s) may be determined by altering the signal output by the digital processing circuit 124. In some example embodiments, compensation for the spurious harmonic coupling signal(s) may be performed in the digital baseband. In other example embodiments, the compensation may be performed in the digital passband.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. A circuit or device that is described herein as including certain components may instead be adapted to be coupled to those components to form the described circuitry or device.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Unless otherwise stated, "about," "approximately," or "substantially" preceding a value means +/−10 percent of the stated value. Modifications are possible in the described examples, and other examples are possible within the scope of the claims.

What is claimed is:

1. An electronic circuit comprising:
a transmission signal chain including:
a harmonic coupling cancellation circuit operable to output a harmonic coupling cancellation signal;
a digital up-conversion (DUC) circuit having an output, a first input operable to receive the harmonic coupling cancellation signal, and a second input operable to receive data, the DUC circuit operable to modify the data by the harmonic coupling cancellation signal; and
a digital-to-analog converter (DAC) having an input coupled to the output of the DUC and having an output, the DAC configured to provide a transmitted signal at the output of the DAC; and
a feedback signal chain including an estimation circuit, the estimation circuit operable to:
estimate a spurious harmonic coupling signal according to the transmitted signal; and
provide values representative of the estimate of the spurious harmonic coupling signal to the harmonic coupling cancellation circuit, wherein the harmonic coupling cancellation signal is based on the estimate of the spurious harmonic coupling signal, wherein the harmonic coupling cancellation circuit is operable to provide a signal having the values representative of the estimate of the spurious harmonic coupling signal during a operational mode of operation of the circuit to perform pre-compensation of the transmitted signal according to the estimated spurious harmonic coupling signal.

2. The electronic circuit of claim 1, wherein the transmitted signal includes harmonics of a reference clock of the circuit, and wherein the spurious harmonic coupling signal is representative of the harmonics of the reference clock.

3. The electronic circuit of claim 1, wherein the values representative of the estimate are provided as amplitude and phase values.

4. The electronic circuit of claim 3, wherein the amplitude and phase values are provided for multiple transmission center frequencies of the circuit for the transmitted signal.

5. The electronic circuit of claim 1, wherein the circuit includes multiple transmit signal chains and the values representative of the estimate of the spurious harmonic coupling signal are determined for each of the multiple transmit signal chains.

6. The electronic circuit of claim 1, wherein the harmonic coupling cancellation circuit is operable to provide a signal having programmed values during a calibration mode of operation of the circuit to enable estimating the spurious harmonic coupling signal based on the programmed values.

7. The electronic circuit of claim 1, wherein the electronic circuit is programmable to transmit at one of multiple transmission center frequencies, and wherein the estimate of the spurious harmonic coupling signal is performed for each of the multiple transmission center frequencies.

8. The electronic circuit of claim 1, further comprising an antenna coupled to the output of the DAC.

9. A system comprising:
an amplifier having an input and an output; and
a transceiver having:
 a communication interface;
 a transmit signal chain having an input coupled to an output of the communication interface and an output coupled to the input of the amplifier, wherein the transmit signal chain is configured to provide a signal for transmission to the amplifier; and
 a feedback signal chain having an input coupled to the output of the amplifier and an output coupled to an input of the communication interface, wherein the feedback signal chain is configured to:
  estimate a spurious harmonic coupling component of a signal transmitted by the amplifier; and
  provide values representative of the estimate of the spurious harmonic coupling component to the transmit signal chain for compensation for the spurious harmonic coupling component in the signal for transmission, wherein the transmit signal chain includes a cancellation circuit configured to perform the compensation for the spurious harmonic coupling component during an operational mode of operation of the system, and wherein, during a calibration mode of operation of the transceiver, the cancellation circuit is configured to provide a signal having a programmed value to the transmit signal chain for forming the signal for transmission, the signal having the programmed value for the feedback signal chain estimating of the spurious harmonic coupling component.

10. The system of claim 9, wherein the transceiver is programmable to transmit at one of multiple transmission center frequencies.

11. The system of claim 9, wherein the communication interface is a serializer/deserializer (SerDes) interface or a JESD interface.

12. The system of claim 9, wherein the values representative of the estimate of the spurious harmonic coupling component are in-phase and quadrature component values of the spurious harmonic coupling component.

13. The system of claim 9, further comprising an antenna coupled to the output of the amplifier.

14. A system comprising:
an amplifier having an input and an output; and
a transceiver having:
 a communication interface;
 a transmit signal chain having an input coupled to an output of the communication interface and an output coupled to the input of the amplifier, wherein the transmit signal chain is configured to provide a signal for transmission to the amplifier; and
 a feedback signal chain having an input coupled to the output of the amplifier and an output coupled to an input of the communication interface, wherein the feedback signal chain is configured to:
  estimate a spurious harmonic coupling component of a signal transmitted by the amplifier; and
  provide values representative of the estimate of the spurious harmonic coupling component to the transmit signal chain for compensation for the spurious harmonic coupling component in the signal for transmission, wherein the transceiver is programmable to transmit at one of multiple transmission center frequencies, and wherein, during a calibration mode of operation of the transceiver and for each transmission center frequency of the multiple transmission center frequencies, wherein a cancellation circuit is configured to provide a signal having a programmed value to the transmit signal chain for forming the signal for transmission, the signal having the programmed value for the feedback signal chain estimating of the spurious harmonic coupling component for the transmission center frequency of the multiple transmission center frequencies.

15. The system of claim 14, wherein the transmit signal chain includes a cancellation circuit configured to perform the compensation for the spurious harmonic coupling component during an operational mode of operation of the system.

16. The system of claim 15, wherein, during a calibration mode of operation of the transceiver, the cancellation circuit is configured to provide a signal having a programmed value to the transmit signal chain for forming the signal for transmission, the signal having the programmed value to facilitate the feedback signal chain estimating of the spurious harmonic coupling component.

17. A method comprising:
determining, via a circuit, an estimated value of harmonic coupling in a transmitted signal via a feedback signal path that receives the transmitted signal; and
performing pre-compensation for the harmonic coupling based on the estimated value, the pre-compensation performed in the circuit, wherein the estimated value of the harmonic coupling is determined during a calibration mode of operation of the circuit and is based on amplitude and phase of a harmonic distortion, wherein the amplitude and phase of the harmonic distortion are monitored during an operational mode of operation of the circuit for variance resulting from time or temperature.

18. The method of claim 17, wherein the estimated value of the harmonic coupling is determined for each transmission center frequency of multiple programable transmission center frequencies of the circuit.

19. The method of claim 17, wherein the pre-compensation is performed in one of digital baseband or digital passband of the circuit.

20. The system of claim 14, wherein the communication interface is a serializer/deserializer (SerDes) interface or a JESD interface.

\* \* \* \* \*